(12) United States Patent
Wong

(10) Patent No.: US 7,350,348 B1
(45) Date of Patent: Apr. 1, 2008

(54) FIXED TINE LEAF RAKE

(75) Inventor: Kevin Wong, Lake Elsinore, CA (US)

(73) Assignee: Corona Clipper, Inc., Corona, CA (US)

( * ) Notice: Subject to any disclaimer, the term of this patent is extended or adjusted under 35 U.S.C. 154(b) by 0 days.

(21) Appl. No.: 11/605,928

(22) Filed: Nov. 29, 2006

(51) Int. Cl.
*A01D 7/00* (2006.01)

(52) U.S. Cl. ................................. 56/400.21; 56/400.01

(58) Field of Classification Search ............. 56/400.01, 56/400.1, 400.16, 400.17
See application file for complete search history.

(56) References Cited

U.S. PATENT DOCUMENTS 1,970,616 A * 8/1934 Montan ................... 56/400.17

5,501,069 A * 3/1996 Lentz ........................ 56/400.1

* cited by examiner

*Primary Examiner*—Thomas B. Will
*Assistant Examiner*—Mai T Nguyen

(57) ABSTRACT

A fixed tine leaf rake having a plurality of tines connected to a brace, by a plurality of crimps with each crimp being about two millimeters or less in diameter. A curved tine support bar that has a plurality of openings fastened to the plurality of tines such that each tine fits through one of the openings. The support bar distributes the pressure exerted on each of the tines. A handle sleeve is connected to the brace by a plurality of rivets, with each of the rivets being about three millimeters or less in diameter. A handle inserted into the handle sleeve allows the user to comfortably use the fixed tine leaf rake.

20 Claims, 4 Drawing Sheets

FIXED TINE LEAF RAKE

BACKGROUND OF THE INVENTION

1. Field of the Invention

The present invention relates to a rake and more specifically to a fixed tine leaf rake for gathering leaves, grasses, and other debris.

2. Background

Fixed tine leaf rakes are often used to gather leaves, grasses, and other debris into a pile for easy disposal. The fixed tine leaf rakes typically have a plurality of tines connected to a brace or spine. A handle is attached to the brace. Each tine can be welded, soldered, or crimped to the brace. Welding or soldering each tine to the brace is expensive and may or may not be durable. A handle is typically attached to the brace by a handle sleeve that can be welded, soldered, or riveted to the brace. Welding or soldering the handle sleeve to the brace is expensive and may or may not be durable.

Prior art methods of crimping the tines to a brace have been satisfactory but with limited useful life due to tines breaking loose from the brace. Prior art methods of using rivets to attach the handle sleeve to the brace have been satisfactory but with limited useful life. The rake of the present invention overcomes these problems.

SUMMARY OF THE INVENTION

A rake having a plurality of tines, each tine connected to a brace by a plurality of crimps, with each crimp being about two millimeters or less in diameter. The tines are supported by a floating tine bar that has a plurality of openings, one for each tine. The tine bar is located about half-way between the brace and the working ends of the tines. A handle sleeve is connected to the brace by a plurality of rivets. Each rivet is about three millimeters or less in diameter. A handle inserted into the handle sleeve permits a user to comfortably use the rake in a typical manner.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

The fixed tine leaf rake of the present invention is more durable and cost-efficient than prior art rakes. This fixed tine leaf rake uses at least two crimps to attach each tine to the brace. Each crimp is about two millimeters or less in diameter. A handle sleeve is connected to the brace by three rivets, each rivet being about three millimeters or less in diameter. Using a plurality of crimps for each tine and reducing the crimp size to about two millimeters in diameter, from three millimeters, produced the unexpected result of the tines lasting twice as long before breaking off the brace.

The fixed tine leaf rake of the present invention is used to gather leaves, grasses, and other debris into a pile for easy disposal. The user will extend the head of the fixed tine leaf rake away from his body, press the tines of the fixed tine leaf rake down against the grass or ground, and drag the head of the fixed tine leaf rake back towards his body, with the tines of the fixed tine leaf rake still pressed against the grass or ground. Leaves, grasses, and other debris will be trapped by the tines and be pulled toward the user. When used on dirt, the tines sift through the dirt, only carrying along larger objects like leaves, grasses, and debris. This dragging motion exerts varying degrees of force on the tines and on the connection between the tines and the brace. Over extended use, the tines will break away from the brace. The invention has unexpectedly found that using a plurality of crimps per tine and reducing the crimp size to about two millimeters in diameter doubles the useful life of the rake, by keeping the tines fastened to the brace twice as long.

Figure 1:
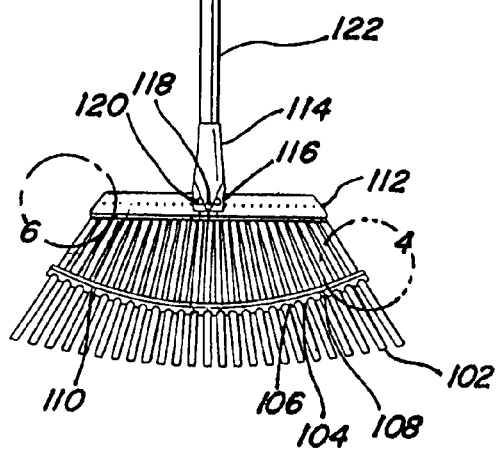
FIG. 1 is a perspective of a fixed tine leaf rake, according to the present invention.

FIG. 1 shows a fixed tine leaf rake 100 having a plurality of tines 102 that press down against the grass or ground and trap leaves, grasses, or other debris as the user drags the rake 100 towards his body.

Figures 2, 3:
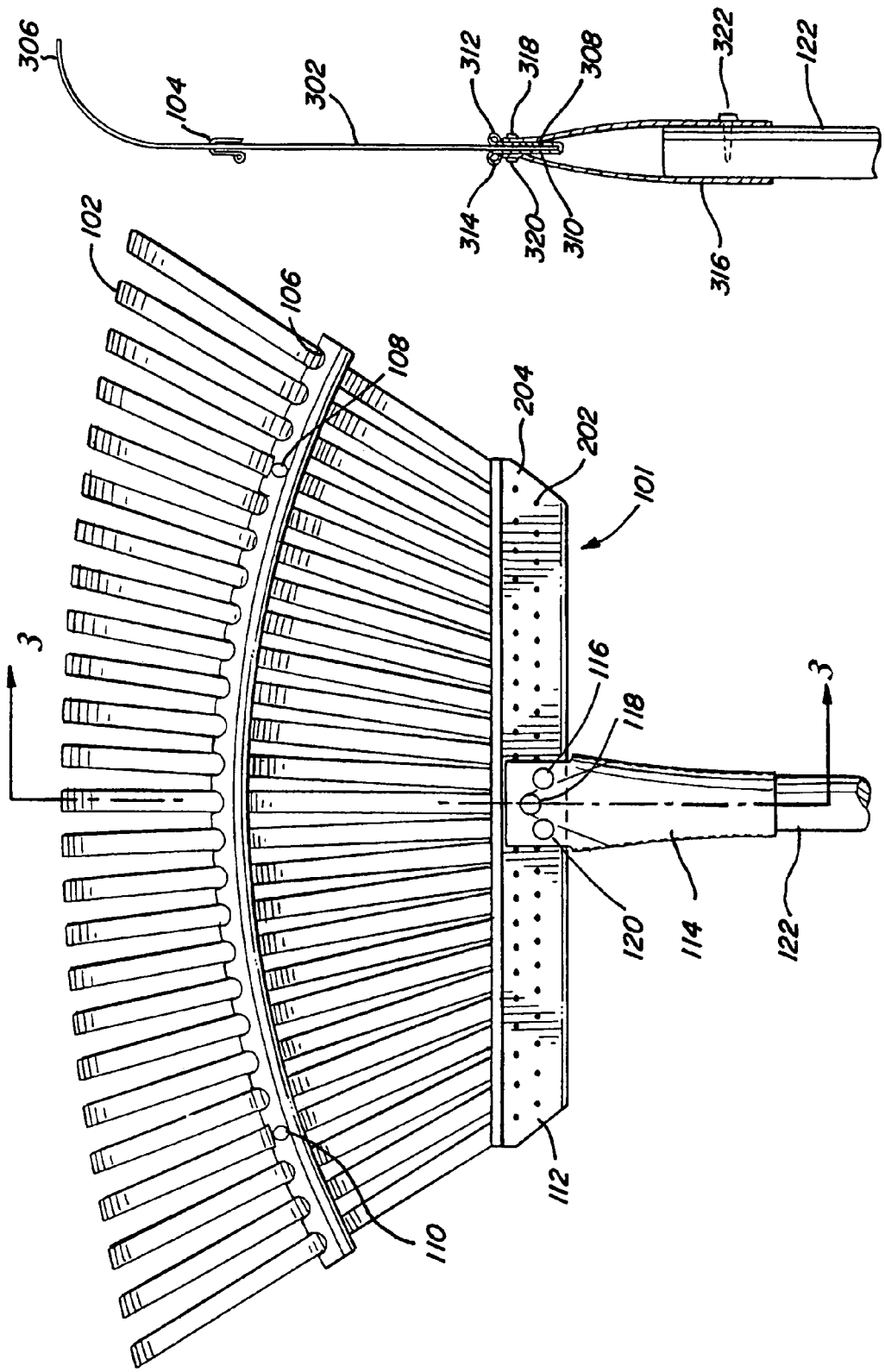
FIG. 2 is a perspective of the fixed tine leaf rake head of FIG. 1.
FIG. 3 is a cross-sectional view of the head of FIG. 2 taken along line 3-3.

The rake head 101 of FIG. 2 shows how the tines 102 are arranged so that they fan out to increase the surface area covered by the rake head 101. The tines 102 may all have the same length or may vary in length across the brace 112. The tines 102 can be made of metal, plastic, or any other suitable material that can be crimped. Tines 102 are flexible so that they can bend and provide even pressure when used on an uneven surface. This is particularly useful when using the rake to collect fallen leaves from plants with fragile root systems allowing the tines to bend and not damage the plant.

As shown in FIG. 3, tines 102 are preferably constructed so that each tine has a straight stem segment 302, a curved section 304, and a straight leaf segment 306 at its tip. The tines 102 may be curved such that the plane of the straight stem segment 302 is about perpendicular to the plane of the leaf segment 306. Leaves, grasses, and other debris are trapped against the tines 102 as the user drags the rake. When used on dirt, the curved tines 102 pass through the dirt so that only the leaves, grasses, and debris are trapped.

Figure 4:
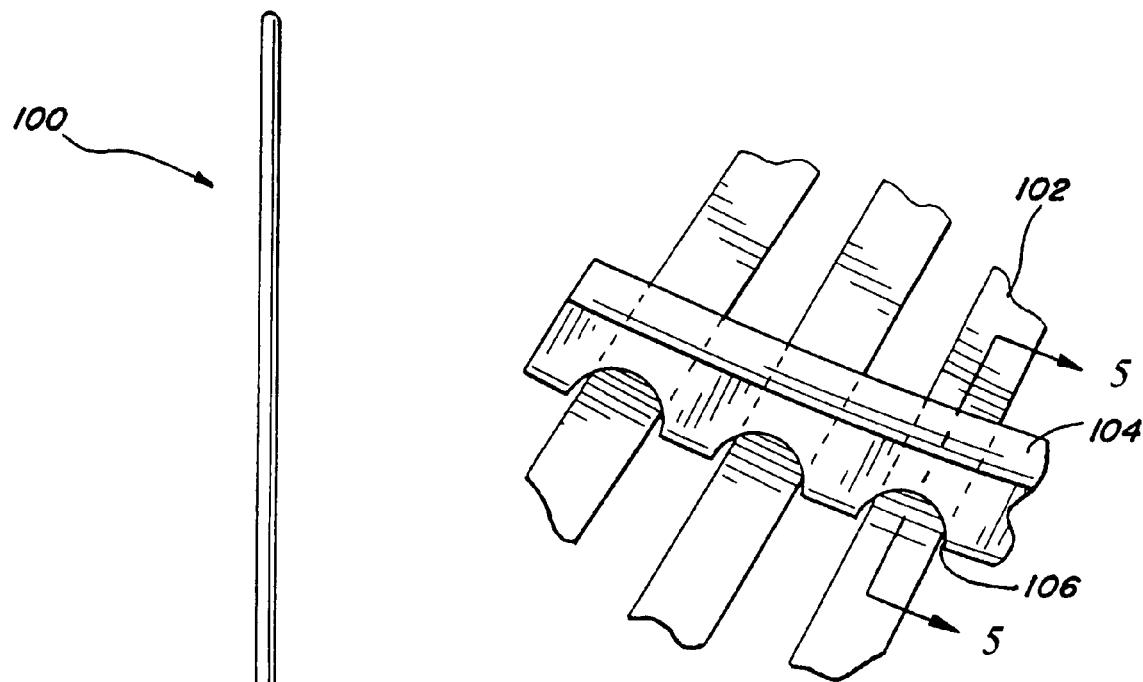
FIG. 4 is a magnified view of a portion of the fixed tine leaf rake of FIG. 1 at area 4.
Figure 5:
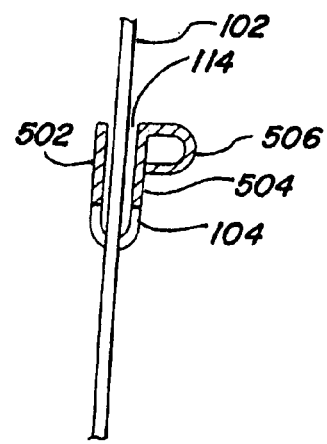
FIG. 5 is a cross-sectional view of the fixed tine leaf rake section of FIG. 4 at line 5-5.

A tine support bar 104 supports the plurality of tines 102. As shown in FIG. 5, the tine support bar 104 is in the shape of a narrow U-shaped trough, with a plurality of openings 106 at the bottom of the trough. Each of the plurality of tines 102 will fit through one of the plurality of openings 106 as shown in FIG. 4. The tine bar 104 may be made of metal, plastic, or any other suitable material that will support the tines together in a floating manner. Tine support bar 104 may be fastened in place on the tines by crimps 108 and 110 (FIG. 1), although additional crimps may be used.

Tine support bar 104 is shaped to follow the contour of the tines and may be curved as shown. Tine support bar 104 evenly distributes pressure among the plurality of tines 102.

FIG. 5 shows that there is clearance between each tine and the walls 502 and 504 of the tine support bar 104. This clearance allows the tines 102 to move within the openings 106 of the tine support bar 104 so that each tine may exert a variable amount of pressure on the grass or ground. The fixed tine leaf rake 100 may be painted. When painted, care must be taken so that the tines 102 can still move within the openings 106 in the tine support bar. For additional strength the tine support bar wall 504 may be curved outwards to form a support loop 506.

Figure 7:
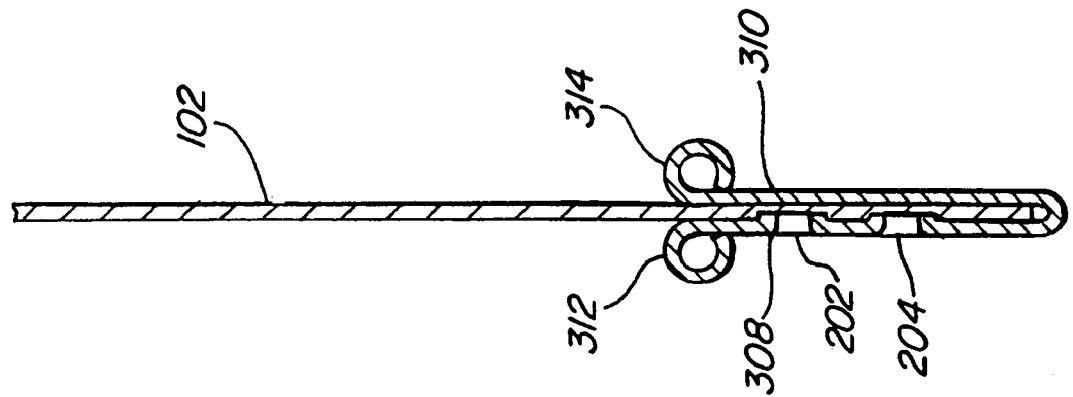
FIG. 7 is a cross-sectional view of a portion of the fixed tine leaf rake of FIG. 6 taken along line 7-7.

FIG. 3 shows how brace 112 is shaped. Brace 112 has two layers 308 and 310. Each of the plurality of tines 102 is held between the two layers. FIG. 7 shows how each tine 102 is held tightly within the brace 112 by crimps 202 and 204. Brace 112 may be made of metal, plastic, or any other suitable material that will allow the tines to be crimped to it. The layers 308 and 310 of the brace 112 may be curled outwards to form brace loops 312 and 314, for added strength.

Figure 6:
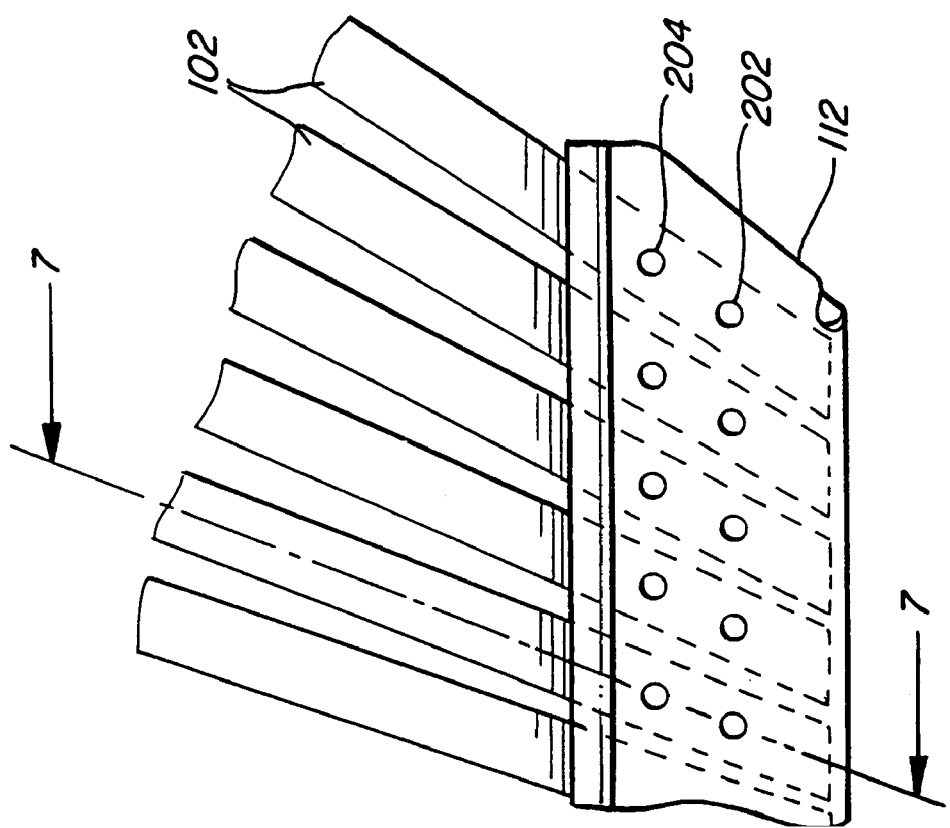
FIG. 6 is a magnified view of a portion of the fixed tine leaf rake of FIG. 1 at area 6.

FIG. 6 shows a section of the brace 112 and how each one of the tines 102 is aligned with and crimped to a layer of the brace 112 using a plurality of crimps 202 and 204. The preferred embodiment of the fixed tine leaf rake 100 uses two crimps 202 and 204 for each tine. The crimps 202 and 204 are about two millimeters or less in diameter. Using a plurality of crimps that are of reduced size as compared to fewer and larger crimps of three millimeters or more in diameter, produces an unexpected and superior rake. The tines in this rake last twice as long as prior art rakes before breaking apart or breaking off the brace.

Handle sleeve 114 comprises a tubular sleeve 316 that flattens at one end and splits into two flaps 318 and 320 that fit on either side of the brace 112. Handle sleeve 114 may be made out of metal or any other suitable material that will allow rivets to be used to fasten it to the brace 112. The preferred embodiment of the fixed tine leaf rake 100 uses three rivets 116, 118, and 120 to connect handle sleeve 114 to brace 112. The rivets pass through flap 318 and brace 112 and out through flap 320. Rivets 116, 118, and 120 have a diameter of about three millimeters or less. This smaller rivet size also helps extend the life of the rake by preventing breakage of the handle sleeve from the brace.

A handle 122, preferably an elongated cylinder or rod, is inserted into handle sleeve 114. Handle 122 may be secured to handle sleeve 114 with a screw 322 or any other convenient fastening device, such as a rivet, for example. Handle 122 may be made of wood, plastic, metal, fiberglass, or any other similar suitable material. Handle 122 may be fitted with a grip at the gripping end to allow the user to obtain a firmer grip on the rake 100.

The inventor discovered the extraordinary longevity of the present rake when he ran tests to compare the performance of his rake to rakes made by a competitor. A cycle test was conducted on ten different prototypes of the fixed tine leaf rake 100 using two crimps in the brace for each tine. Each crimp was about two millimeters in diameter. The handle sleeve 114 was held to the brace by a plurality of rivets with each rivet being about three millimeters in diameter. The test cycles were continued until a tine or tines broke apart or broke off the brace. The cycle test was performed by a machine that repeatedly scraped the tines of a prototype rake 100 and the competitor's rake against a flat metal plate until each rake had a tine broken off the brace.

The same cycle test was conducted on ten different pairs of a fixed tine leaf rake prototype and a competitor's fixed tine leaf rake of similar construction. The competitor rakes of California Flex Rakes were used.

Comparing the results from the cycle tests shows an unexpected and surprising result. All ten prototype rakes 100 had broken tines only after about twice as many scrapes as the ten competitor's rakes. This result was unexpected and surprising because the thickness of the tines both the fixed tine leaf rake 100 of the present invention and the rakes of California Flex Rake are the same.

The fixed tine leaf rake 100 of the present invention far outperformed the California Flex Rake when it came to the tines breaking apart. The tines of the fixed tine leaf rake 100 of this invention lasted 127% longer than the tines of the California Flex Rake before breaking apart. Even the worst trial for the fixed tine leaf rake 100 of this invention was over 66% better than the best trial for the California Flex Rake.

Figure 8:
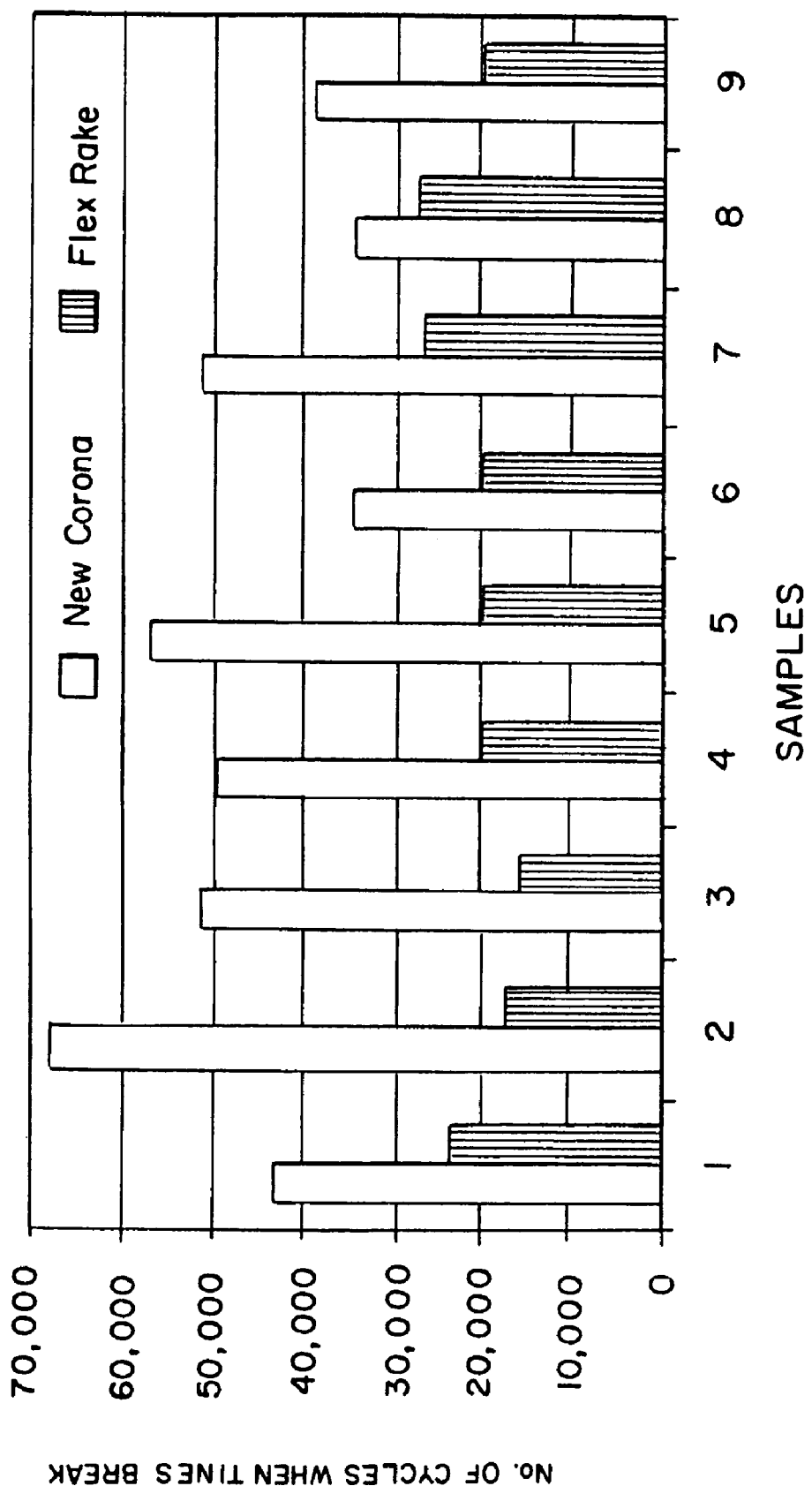
FIG. 8 is a bar graph comparing test results of prototypes of the fixed tine leaf rake of the present invention against a competitor's like constructed fixed tine leaf rakes.

FIG. 8 compares the test results of the first nine rakes in bar graph form. The graph clearly shows the number of cycles each rake lasted before the tines broke apart. For each trial, the fixed tine leaf rake 100 of this invention far outperformed the California Flex Rake.

It became apparent that using a plurality of crimps for each tine at a reduced crimp diameter of about two millimeters, as compared to three millimeters or more in diameter for previous (old) rakes, produced the unexpected result, the tines lasting twice as long.

The test used by the inventor to compare rakes built according to the present invention (New Corona) against like constructed rakes made by a competitor, California Flex Rake ("Flex Rake") produced the data in the below table. Ten separate rakes from each manufacturer, New Corona and Flex Rake, were tested against each other. The test results, tabulated below, indicate that the New Corona rake, made according to the present invention, on average, lasted twice as long as the Flex Rake, before a tine broke.

The bar graph, FIG. 8 illustrates in a more visual manner the substantial improvement in performance of the New Corona rake, constructed according to the present invention.

|  | No. of Cycles Before Breaking | |
| --- | --- | --- |
| Sample No. | New Corona | Flex Rake |
| 1 | 43,184 | 23,438 |
| 2 | 67,903 | 16,859 |
| 3 | 51,102 | 15,172 |
| 4 | 49,192 | 20,145 |
| 5 | 56,594 | 19,853 |
| 6 | 34,000 | 19,716 |
| 7 | 50,783 | 26,151 |
| 8 | 33,873 | 26,724 |
| 9 | 37,895 | 19,652 |
| 10 | 37,462 | 15,610 |
| Average | 46,199 | 20,332 |

Surprised by this unexpected large improvement in performance, the inventor conducted another test to compare rakes made according to the present invention (New Corona) against rakes made by Corona not using the present invention (Old Corona), and like constructed rakes by a competitor, California Flex Rake ("Flex Rake").

The test bed was readjusted and three separate rakes of each kind (New Corona, Old Corona, and Flex Rake) were tested, against each other.

The test results, tabulated below, indicate that the rake longevity of the present invention, the New Corona rake, on average, lasted almost twice as long as the Old Corona rake or the Flex Rake.

| Sample No. | No. of Cycles Before Breaking | | |
|---|---|---|---|
| | Old Corona | New Corona | Flex Rake |
| 1 | 15,068 | 26,151 | 14,500 |
| 2 | 7,283 | 31,318 | 18,599 |
| 3 | 22,788 | 26,728 | 18,332 |
| Average | 15,046 | 28,066 | 17,144 |

The improvement in longevity of the rake made according to the present invention is truly surprising, resulting in a much better quality product for the consumer.

What is claimed is:

1. A rake, comprising:
a brace;
a plurality of tines connected to the brace, each tine connected with a plurality of crimps, with each crimp being about two millimeters or less in diameter, and with each tine being wider than each crimp;
a handle sleeve connected to the brace by a plurality of rivets; and
a handle inserted into the handle sleeve.

2. The rake of claim 1 wherein the brace has two layers, the tines are held between these two layers, and the tines are crimped to one of the layers.

3. The rake of claim 1 further comprising a tine support bar for connecting to each of the tines.

4. The rake of claim 3 wherein the tine support bar is in the shape of a narrow U-shaped trough, with a plurality of openings at the bottom of the trough such that each of the plurality of tines will fit through one of the plurality of openings.

5. The rake of claim 4 wherein the tine support bar is curved.

6. The rake of claim 1 wherein the handle sleeve comprises a tubular sleeve that flattens at one end and splits into two flaps that fit on either side of the brace and are connected to the brace by the plurality of rivets.

7. The rake of claim 6 wherein the plurality of rivets is three rivets about three millimeters or less in diameter.

8. The rake of claim 1 wherein the handle is held in the handle sleeve by a screw.

9. The rake of claim 1 wherein each tine is curved so that there is a straight stem segment, a curved segment, and a straight flexible segment, such that the plane of the straight stem segment is about perpendicular to the plane of the straight flexible segment.

10. The rake of claim 1 wherein each tine is the same fixed length.

11. The rake of claim 1 wherein each tine is flexible.

12. A rake, comprising:
a two-layer brace;
a plurality of tines held between the two layers of the brace, each tine connected to the brace by a plurality of crimps, with each crimp being about two millimeters or less in diameter, and with each tine being wider than each crimp;
a tine support bar having the shape of a narrow U-shaped trough and connected to one or more of the plurality of tines by one or more crimps, with a plurality of openings at the bottom of the trough, each of the plurality of tines fitting through a respective one of the plurality of openings;
a handle sleeve connected to the brace by a plurality of rivets, with each rivet being about three millimeters or less in diameter; and
a handle connected to the handle sleeve.

13. The rake of claim 12 wherein the tine support bar is curved.

14. The rake of claim 12 wherein the handle sleeve comprises a tubular sleeve that flattens at one end and splits into two flaps that fit on either side of the brace and are connected to the brace by the rivets.

15. The rake of claim 12 wherein the handle is inserted into the handle sleeve and fastened with a screw.

16. The rake of claim 12 wherein each tine is curved so that there is a straight stem segment, a curved segment, and a straight flexible segment, such that the plane of the straight stem segment is about perpendicular to the plane of the straight flexible segment.

17. The rake of claim 12 wherein each tine has a fixed length that may vary from the length of the other tines.

18. The rake of claim 12 wherein each tine is flexible.

19. A rake, comprising:
a two-layer brace;
a plurality of tines held between the two layers of the brace by two crimps, each crimp being about two millimeters or less in diameter, each tine being wider than each crimp, each tine being curved so that there is a straight stem segment, a curved segment, and a straight flexible segment, such that the plane of the straight stem segment is about perpendicular to the plane of the straight flexible segment;
a curved tine support bar connected to one or more of the plurality of tines by one or more crimps, shaped as a narrow U-shaped trough, and having a plurality of openings at the bottom of the trough so that each of the plurality of tines fit through a respective one of the plurality of openings;
a handle sleeve comprising a tubular sleeve that flattens at one end and splits into two flaps that fit on either side of the brace connected to the brace by three rivets, with each rivet being about three millimeters or less in diameter; and
a handle connected to the handle sleeve.

20. The rake of claim 19 wherein the handle is held into the handle sleeve by a screw and may be fitted with a grip.

* * * * *